W. SIMONSSON.
WEIGHING SCALE.
APPLICATION FILED APR. 2, 1910.
1,101,215.
Patented June 23, 1914.
3 SHEETS—SHEET 3.
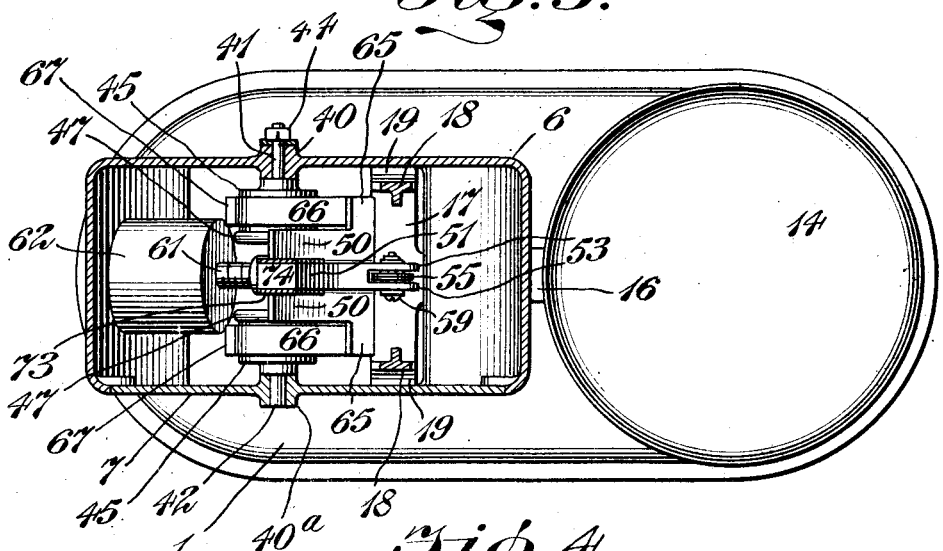
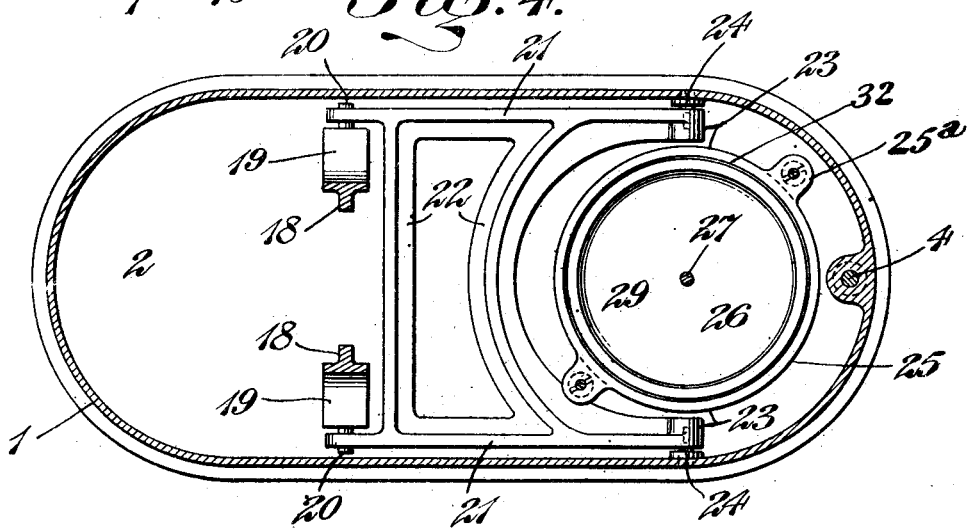
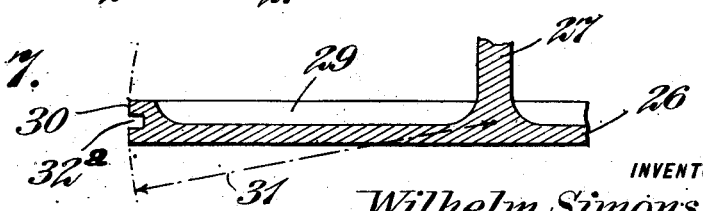
WITNESSES
Q. C. Abbott
INVENTOR
Wilhelm Simonsson
BY
ATTORNEY

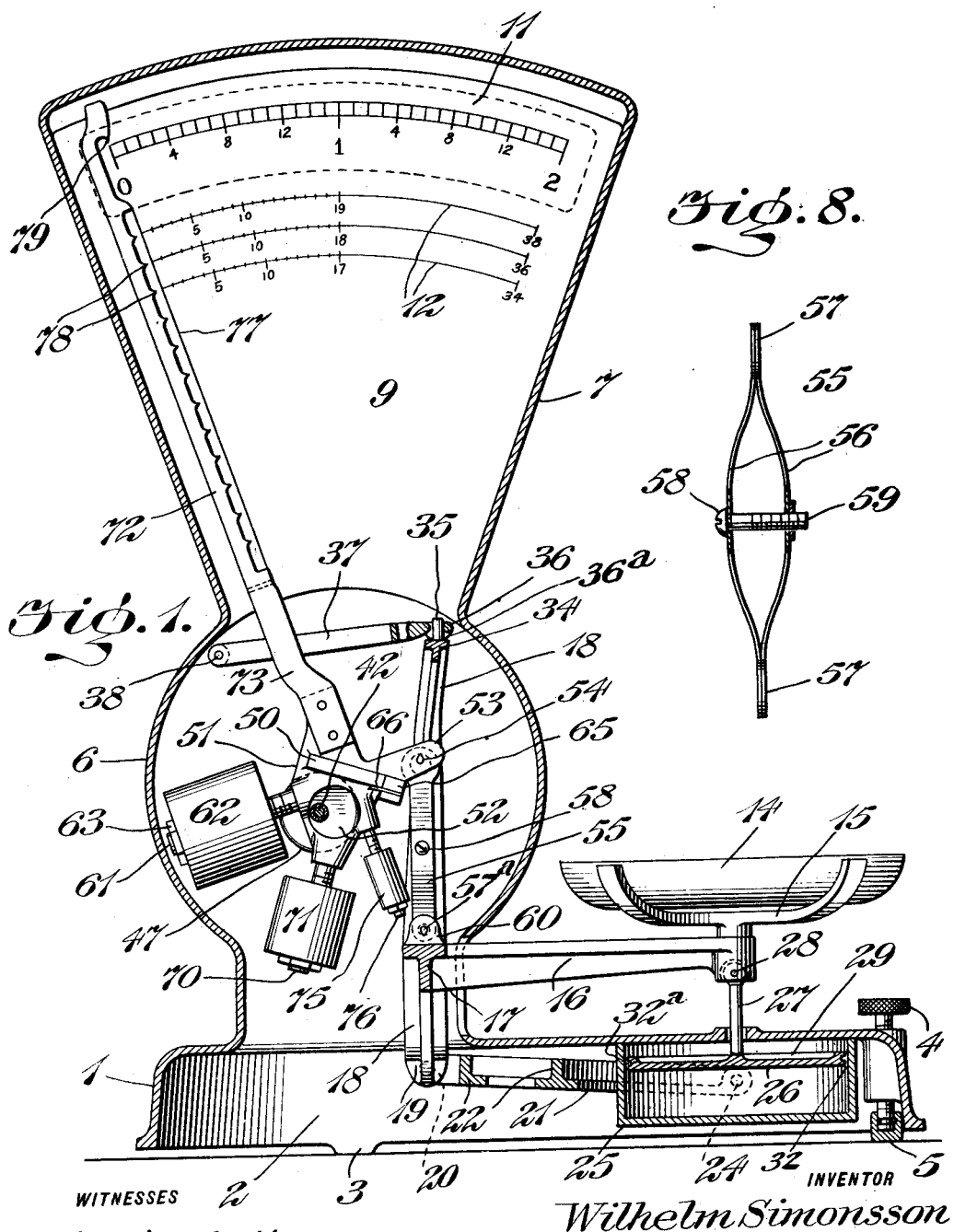

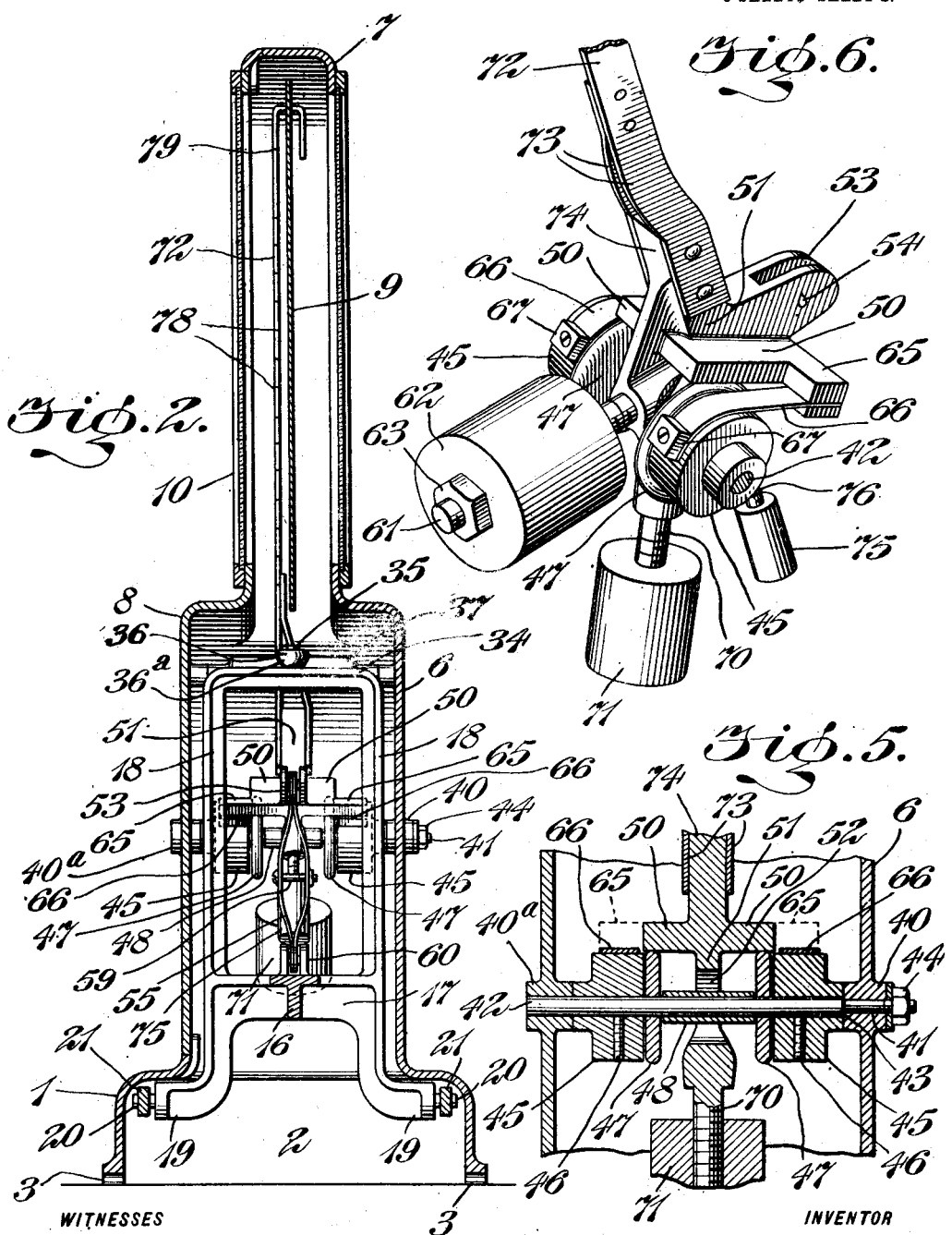

UNITED STATES PATENT OFFICE.

WILHELM SIMONSSON, OF NEW YORK, N. Y.

WEIGHING-SCALE.

1,101,215.

Specification of Letters Patent. Patented June 23, 1914.

Application filed April 2, 1910. Serial No. 553,161.

*To all whom it may concern:*

Be it known that I, WILHELM SIMONSSON, a subject of the King of Sweden, and a resident of the city and State of New York, have invented certain Improvements in Weighing-Scales, of which the following is a specification.

This invention relates to certain improvements in weighing scales, and has for its object to provide a device of this general character of a simple and comparatively inexpensive nature, and of a strong, compact and durable construction, having certain features of novelty and improvement whereby material advantages are attainable in the manufacture of the scale, and whereby greater accuracy and increased convenience are assured in the practical employment thereof.

The invention consists, in part, in a weighing scale having a fulcrum member, means to support a load or article to be weighed, a suspended lever connected with such load supporting means and counterbalanced to compensate for excessive weight thereof, and having shifting contact with the fulcrum member under the influence of the load during the weighing operation, and a weight or poise connected with such lever in such position and arrangement as to exert a gradually increasing force thereon as the load is increased.

The invention also consists, in part, in a weighing scale having a fulcrum member, means to support a load or article to be weighed, a suspended lever connected with such load supporting means and having shifting descending movement over the fulcrum member under the influence of the load during the weighing operation, and a weight or poise connected with such lever in such position and arrangement as to exert a gradually increasing strain thereon as the load is increased.

The invention also consists, in part, in a weighing scale having adjusting means of a novel and improved description including a flexible member affording connection between two of the operative parts of the scale, and controllable means for variably flexing said member to vary the relation of such connected parts.

The invention also contemplates certain novel features of the construction and combinations and arrangements of the several parts of the improved weighing scale, whereby certain important advantages are attained, and the device is rendered simpler, less expensive and otherwise better adapted and more convenient for use, all as will be hereinafter fully set forth.

The novel features of the invention will be carefully defined in the claims.

In order that my improvements may be the better understood, I will now proceed to describe my invention with reference to the accompanying drawings, wherein—

Figure 1 is a sectional side elevation of a weighing scale constructed according to my invention, and designed for counter or similar uses; Fig. 2 is a sectional view taken vertically and transversely through the improved weighing scale; Fig. 3 is a sectional plan view taken through the improved weighing scale; Fig. 4 is a horizontal section taken through the lower portion of the improved weighing scale; Fig. 5 is an enlarged fragmentary sectional view taken vertically through the fulcrum means in line with the axis thereof, and showing certain features of construction to be hereinafter described; Fig. 6 is an enlarged fragmentary perspective view showing certain features of construction of the pendulating lever and its fulcrum means; Fig. 7 is an enlarged sectional detail view illustrating certain features of construction of the dash pot retarding means to be hereinafter referred to and Fig. 8 is an enlarged sectional detail view illustrating certain features of the improved adjusting means which will be hereinafter described.

While I have herein illustrated my improvements embodied in a weighing scale such as is particularly designed and adapted for use upon the counters of stores and the like, and although my invention presents many important advantages for use in connection with scales of this general class, I do not desire to be understood as limiting myself to this special application of my improvements exclusively, since it will be apparent that many features of the invention are capable of employment with equally good results in connection with scales of various other types and kinds.

As shown herein, the scale is provided with a frame or casing having a lower or base portion of elongated flattened formation, as indicated at 1 upon the drawings, provided with an internal space or chamber 2 for the reception of certain operative parts, and having feet 3 produced at opposite sides adjacent to one end and adapted to rest upon a counter or the like, while its opposite end has an adjustable supporting or leveling means including a screw 4, the lower end of which has an enlargement or shoe 5 also adapted for engagement with the counter or other support whereon the scale is rested.

At one end of the flattened lower or base portion 1 is produced a cylindrical portion 6, extended above and integrally connected with said base portion and chambered or hollowed interiorly for the reception of certain of the operative parts which have connections extended down within the chamber or space 2 within said base portion, and above said cylindrical casing portion 6 is extended a segment-shaped flattened casing portion 7, chambered or hollowed internally for the reception of the index mechanism which, as herein shown, includes a plate 9 having certain concentric segmental graduations, one of which, as 11 is intended to indicate weight, while others, as 12, are intended to indicate different prices per pound or unit of weight. The cylindrical and sector-shaped casing portions 6 and 7 are herein shown integrally connected, and one wall of each, as 8 is removably held in relation to the casing, so that it may be conveniently separated from the body of the casing or frame to afford unobstructed access to the interior chambers of such casing portions 6 and 7. The upper portion of such wall 8 is also shown provided with a glazed sight aperture 10, whereat the graduations upon index plate or member 9 may be read during use of the improved scale. A similar aperture may be produced in the opposite wall of the casing portion 7 for the view of graduations produced upon the rear or obverse side of the plate or member 9.

14 represents a platter or pan at the end of the elongated base portion opposite to which the casing portion 6 rises, such pan or platter being supported by a spider 15 carried by an arm or part 16 horizontally extended above that end of the casing portion 1 and integrally connected with a draft member 17 which is supported for vertical movement within the chamber or hollow of the cylindrical casing portion 6 and, as shown in Fig. 2, is made in elongated rectangular form, having the arm or part 16 projecting from the central portion of its lower bar, its side members 18, 18 being extended upwardly from such lower bar in spaced relation, and being tied or connected together at their upper ends by the upper transverse bar 34, while their lower ends are caused to depend below said lower bar and are extended within the chamber 2 of the casing base and made to diverge as indicated at 19, 19. The divergent lower portions 19, 19 of said draft member are provided with pivot pins 20, 20, as indicated in Figs. 1 and 2, whereby pivotal connection is afforded with the adjacent end of a lever member 22, horizontally extended within the chamber 2 and comprising integrally joined side portions or bars 21, so spaced as to play adjacent to the opposite walls of the base 1, to which walls they are pivoted at the end opposite to the draft member 18, as shown at 24 in Fig. 4. The side bars or portions 21, 21 have their ends which are pivotally connected with the casing spaced apart as shown at 23 at such a distance one from the other as will permit the location of a dash pot 25 between them, said dash pot being of cylindrical formation, closed at its bottom and having its open top sealed by the flattened top plate of the base portion 1 of the scale frame whereto such dash pot is securely attached by screws or the like passed through apertured lugs $25^a$ upon the dash pot and engaged with said top wall or plate of the base 1.

The pivotal connections 23, 23 of the lever member 22, and also the dash pot 25 are vertically alined beneath the pan or platter 14, and 27 represents a pendent rod or stem pivotally joined at 28 with the extremity of the arm 16 of the draft member 17, extended down through an aperture in the top plate of the casing base 1 and playing axially within said dash pot 25, wherein said stem or rod has connection with a piston or septum 26 which is caused to be forced downward within said dash pot in unison with the descent of the pan or platter 14 during the weighing operation. The septum 26 is provided in its upper surface with an annular groove or recess 29 surrounded by a raised edge wall, as clearly indicated in Figs. 1 and 4, in which recess dust and foreign matters entering through the apertured top plate are received and retained, being prevented from entering into the dash pot by such raised edge wall so that obstruction of such dash pot and consequent interference with the operation of the scale is thereby prevented.

The diameters of the internal chamber of the dash pot 25, and of the septum 26 traversing the same, are made comparatively great with respect to the stroke of the septum during the weighing operation, whereby a comparatively great resistance is offered by the air imprisoned beneath the septum to movement of the latter, and by this means I am enabled to dispense with a close joint between the perimeter of the septum and the wall of the dash pot cylinder, and to leave a narrow space or clearance between these parts as indicated at 32 in Figs. 1 and 4, for the gradual escape of air from the cylinder during descent of the septum. By this arrangement of the parts friction due to contact of the septum with the dash pot wall is also avoided, with resultant increased accuracy, while at the same time wear of the parts is practically eliminated. By finishing the perimeter of the septum 26 with a partispherical surface struck with a radius from the center of the septum, as indicated at 31 in Fig. 7, and by pivotally connecting the stem or rod 27 with the arm 16 of the draft member as aforesaid, greater freedom of movement of the septum is afforded, and by producing an annular channel around the central part of the peripheral surface of the septum, as indicated at 32ª in Figs. 1 and 7, an air packing is afforded which is designed to impede the escape of air from the dash pot during descent of the septum.

The lever member 22 affords means whereby the lower end of draft member 17 is guided for vertical endwise movement, and whereby said member 17 is prevented from oscillatory or swaying movement at its lower part, and at the upper part of said member 17, within the upper part of the chamber of the casing portion 6 I provide a similar lever member 37, made in U-shape, the transverse bar or part 36 thereof being centrally apertured as indicated in Fig. 1, for engagement with an upstanding pin 35 central upon the upper transverse bar 34 of the draft member, while the arms of such U-shaped lever member 37 are extended from said draft member in a direction reverse to that wherein the lever member 22 is extended, such arms of member 37 being directed in spaced relation across the upper part of the casing portion 6 and being pivotally supported therein at 38. Member 37 is thus caused to operate with the draft member similar to lever member 22 for its support and for the prevention of swaying or oscillatory movement. To lessen friction, the eye 36 is provided with a convex or rounded under surface contacting on the transverse bar 34 of the draft member.

The fixed circular wall of the casing portion 6 has a bearing 40 produced in horizontal alinement with a similar bearing 40ª upon the removable wall 8, and 42 represents a pin or stud extended transversely across said casing portion 6 having one extremity, as 41, reduced and screw-threaded and fitted accurately in the bearing 40 at the fixed wall of said casing portion, and provided with a nut 44 at the outer side thereof, a shoulder 43 being produced on the pin or stud, adapted to be drawn into secure engagement with the inner face of the bearing 40 when the nut is tightened, so as to afford a substantially rigid mounting for said pin or stud at that side of said casing portion 6. The pin or stud 42 is of such length that its opposite end finds secure support in the bearing portion 40ª in the removable wall 8 of the casing. Such pin or stud serves for the support within said casing portion 6 of spaced bearing or supporting members 45, 45, which as herein shown are in the nature of disks having rounded or curved peripheral bearing surfaces struck with like radii, and secured against turning and longitudinal shifting movement upon the pin or stud 42 by means of set screws 46. Between the bearing or supporting members 45, 45 the pin or stud supports spaced fulcrum disks or members 47, 47, separated from each other by a spacing sleeve 48, so as to stand adjacent to the inner or adjacent faces of the bearing or supporting disks or members 45, 45, and adapted for free and independent turning movement upon said pin or stud 42. These fulcrum disks or members 47, 47, are made in diameters slightly greater than the bearing or supporting disks or members 45, 45, so that their peripheral portions are caused to project slightly above and around the rounded peripheral bearing surfaces of said disks or members 45, 45, as clearly shown in Figs. 3, 5 and 6, and said projecting peripheral surfaces of the fulcrum disks or members are made curved or rounded in cross section, as clearly shown in the drawings, and are adapted for rolling contact against the undersides of elongated flattened tracks or projections 50, 50, produced upon or extended from the opposite sides of the upper part of a pendulating lever member 51, which is extended downwardly between said fulcrum disks or members 47, 47 and is apertured as shown at 52 for the passage of the pin or stud 42 and sleeve 48 thereon, and to permit a certain extent of swinging movement of said lever member in unison with the movement of the draft member, during which movement the tracks or projections 50, 50 roll around the peripheral surfaces of the fulcrum disks or members 47, 47. At its upper part, the lever member 51 is provided with integral spaced lugs 53 between which is extended a knife edge 54 or its equivalent, whereto is pivotally coupled the upper end of a connecting member 55, shown in detail in Fig. 8 and which comprises, as therein shown, two resilient or spring metal strips 56, with extremities 57, 57 laid closely adjacent to each other or secured together and perforated, while their central portions are bent or bowed outward away from each other and are perforated for the passage of an adjusting screw 58, the head end whereof is collared in the aperture of one such strip, while its threaded extremity has adjustable screw engagement, as indicated at 59, with the central aperture of the other strip 56, in such a way that turning movement of the screw will draw the bent or bowed central portions of said strips 56 toward one another or force them apart, and thereby vary the length of the member 55. As stated, the apertured upper end of this connecting member 55 is hung upon the knife edge 54 of lever member 51, while the lower apertured end of said member depends below the forks 53 and has pivotal connection as indicated at 57ᵃ in Fig. 1, with a knife edge mounted between lugs central upon the draft member 17 above and in alinement with the connection of arm 16 therewith, so that the vertical movement of said draft member under the influence of the load rested upon pan or platter 14 is communicated to said lever member 51 to swing the same pivotally and cause the tracks or projections 50 thereof to traverse the peripheral surfaces of the fulcrum disks or members 47, 47. For the accurate support of the lever member 51 during such swinging or rocking movement, flexible suspenders 66 are provided which, as herein shown, are in the form of thin flexible metal tapes or strips extended at opposite sides of the projections or tracks 50, 50, their lower ends being secured by any approved means to lugs or extensions 65, outwardly directed from the lower or forward ends of said tracks 50, while the upper parts of such suspenders traverse the curved or rounded peripheral surfaces of the bearing or supporting disks or members 45, 45, and are attached thereto at their extremities by means of clips 67 or the like.

The tracks or projections 50, which rest upon the fulcrum disks or members 47 are of such widths, measured transversely that they do not overhang the peripheral surfaces of the bearing or supporting members 45 to any material extent, whereby it will be seen that said tracks or projections are prevented from pressing or bearing upon the suspenders 66, 66 which, as stated are located outside such tracks. As shown herein, the radial difference between the bearing and fulcrum members 45 and 47 is also substantially equivalent to half the thickness of the tapes or suspenders 66, so that friction is eliminated as much as possible, and a high degree of accuracy is attained in the operation of the improved weighing scale.

At its side opposite to the lugs 53 wherewith the member 55 is coupled, the lever member 51 carries a threaded pin or stem 61, whereon is adjustably supported and held by means of a lock nut 63 or the like, a counterpoise 62, capable of operation to counterbalance the draft means and connected parts of the scale, and at its lower part, said lever member has a similar pendent threaded pin or stem 70, whereon is adjustably held a poise 71, which is adapted, during the swinging or rocking movement of the lever member, to exert a gradually increasing leverage by reason of the travel of the tracks or projections 50 along the peripheral surfaces of the fulcrum disks or members 47 so as to be capable of balancing gradually increasing loads upon the pan or platter 14. The upper part of the lever member 51 is also provided with an integral upwardly directed part 74, to opposite sides whereof are affixed spaced strips 73 connected with the lower end of an index or pointer 72 which is directed upward between the spaced arms of the lever member 37 and within the sector-shaped casing portion 7, so as to be adapted to play over the index plate or member 9 therein for coöperation with the graduations 11 and 12 thereon for the indication of the weights and prices of the various loads imposed upon the pan or platter. As shown in the drawings, this pointer 72 has a part 79 coöperating with the weight graduations 11, and similar parts 78, 78, for coöperation with the several price graduations 12. The pointer 72 is also counterbalanced by a weight 75 at the lower part of the lever member 51, held on a stem or pin 76 alined with the pointer across the point of support of the lever member upon the fulcrum disks 47.

In the use of the improved weighing scale, the draft member is caused to descend under the influence of the load upon the pan or platter, and communicates its movement with a minimum of loss and friction to the lever member 51, whereby the index member or pointer 72 is caused to traverse the graduations upon the member 9 for the indication of the weight and price, if the price is to be ascertained. During this operation the septum 26 traverses the dash pot 25 in a gradual and regulated manner, without undue friction, so that vibration of the parts is also reduced to a minimum, and the arrangement of the counterpoise 62 for movement during the weighing operation through an arc as near as possible to a horizontal plane intersecting the point of support of the pendulating lever member 51 upon the fulcrum disk or members 47 assures accurate counterbalancing of the draft member and connected parts of the scale, while the employment of the poise 71 pendant from the lower part of such pendulating lever member permits movement of such poise through an arc or part wherein it exerts a gradually increasing leverage such as is desirable for the attainment of the best results and for affording the greatest range of capacity of the scale. The construction of the improved scale is also of material advantage by reason of its simplicity and the readiness with which it may be manufactured, assembled and repaired, and the adjustable connecting member 55, if the same be employed, permits of readily and conveniently adjusting the connected parts as may be desirable for attaining accuracy of operation and the bearing or supporting disks or members 45, 45 to be turned upon the pin or stud 42 as may be requisite for shifting the initial position of the pendulating lever member 51 with respect to the fulcrum disks or members 47, in setting the index to zero. It will also be obvious from the above description that the improved weighing scale constructed according to my invention is susceptible of considerable modification without material departure from the principles and spirit of the invention and for this reason I do not desire to be understood as limiting myself to the precise formation and arrangement of the several parts of the device herein set forth in carrying out my invention in practice.

Having thus described my invention, what I claim and desire to secure by Letters Patent is—

1. A weighing scale having a fulcrum member, means to support a load to be weighed, a suspended lever connected with such load supporting means and counterbalanced to compensate for excessive weight thereof and having shifting contact with the fulcrum member under the influence of the load during the weighing operation, and a poise connected with such lever and adapted to exert a gradually increasing force thereon as the load is increased during weighing.

2. A weighing scale having a fulcrum member, means to support a load to be weighed, a suspended lever connected with such load supporting means and adapted for shifting descending movement over the fulcrum member under the influence of the load during the weighing operation, and a poise connected with such lever and adapted to exert a gradually increasing force upon the lever as the load is increased during weighing.

3. A weighing scale having a fulcrum member, a suspended lever having rocking support upon the fulcrum member and provided with a poise adapted to exert a gradually increasing force upon the lever when the same is rocked upon the fulcrum member during the weighing operation, means for supporting a load to be weighed connected with the lever to rock the same, and a counterpoise connected with the lever adjacent to a horizontal plane traversing the point of support of the lever upon the fulcrum member.

4. A weighing scale having a fulcrum member, a suspended lever having rocking support upon the fulcrum member and provided with a poise adapted to exert a gradually increasing force upon the lever when the same is rocked upon the fulcrum member during the weighing operation, means for supporting a load to be weighed connected with the lever at one side of its point of support upon the fulcrum member and adapted to communicate rocking movement thereto during the weighing operation, and a counterpoise connected with the lever at the opposite side of its point of support upon the fulcrum member and adjacent to a horizontal plane traversing such point of support of said lever upon said fulcrum member.

5. A weighing scale having a fulcrum member, means to support a load to be weighed, a draft member vertically movable at one side of the fulcrum member and actuated from the load supporting means, a counterpoise to compensate for excessive weight of the load supporting means and draft member, a suspended lever having rocking support upon the fulcrum member and connected with the draft member, and a poise connected with said suspended lever and adapted to exert a gradually increasing force thereon when the lever is rocked upon the fulcrum member during the weighing operation.

6. A weighing scale having a fulcrum member, means to support a load to be weighed, a vertically movable draft member positioned at the side of the fulcrum member and having a laterally directed arm connected with the load supporting means, means for compensating for excessive weight of the draft member and said load supporting means, a suspended lever having rocking support upon the fulcrum member and connected with the draft member, and a poise connected with said suspended lever and adapted to exert a gradually increasing force thereon when the lever is rocked upon the fulcrum member during the weighing operation.

7. A weighing scale having a fulcrum member, means to support a load to be weighed, a draft member vertically movable at one side of the fulcrum member and actuated from the load supporting means, a suspended lever having rocking support upon the fulcrum member and provided with a poise adapted to exert a gradually increasing force upon such lever when the same is rocked during the weighing operation, a connection between the draft member and the lever at one side of the point of support of such lever upon the fulcrum member for communicating rocking movement to the lever during the weighing operation, and a counterpoise at the side of the fulcrum member opposite to the draft member and connected with the lever adjacent to a horizontal plane intersecting the point of support of the lever upon said fulcrum member.

8. A weighing scale having a shaft, fulcrum disks supported in spaced relation thereon, bearing members adjustably supported upon said shaft, flexible suspenders arranged to wind upon said bearing members, and a lever connected with said suspenders and having opposite sides engaged for rocking support upon the respective fulcrum disks and provided with a pendent weighted part extended in alinement with the space between said fulcrum disks.

9. A weighing scale having a fulcrum member provided with a curved bearing surface, a lever supported for rocking movement having a bearing surface adapted to traverse said curved bearing surface of the fulcrum member when the lever is rocked and provided with a weighted part operating as a poise, and suspending means for said lever operable to compel true rolling contact of said lever upon the curved bearing surface of the fulcrum member when said lever is rocked.

10. A weighing scale having a fulcrum member provided with a curved bearing surface, a lever supported for rocking movement having a bearing surface adapted to traverse said curved bearing surface of the fulcrum member when the lever is rocked and provided with a weighted part operating as a poise, and suspending means for said lever including flexible bands having connection with the lever at opposite sides of the fulcrum member, and curved parts concentric with the curved bearing surface of the fulcrum member whereon said flexible bands are adapted to wind.

11. A weighing scale having a fulcrum member provided with a curved bearing surface, a lever supported for rocking movement having a bearing surface adapted to traverse said curved bearing surface of the fulcrum member when the lever is rocked and provided with a weighted part operating as a poise, and suspending means for said lever including flexible bands having connection with the lever at opposite sides of the fulcrum member, and relatively adjustable curved parts concentric with the curved bearing surface of the fulcrum member, whereon said flexible bands are held to wind.

12. A weighing scale having a fulcrum member provided with a curved bearing surface, a lever supported for rocking movement having a bearing surface adapted to traverse said curved bearing surface of the fulcrum member when the lever is rocked and provided with a weighted part operating as a poise, and suspending means for said lever including a flexible band coupled with the lever, and a part curved concentrically with the curved surface of the fulcrum member whereon said flexible band is adapted to wind, the radius of said last mentioned curved part being less than the radius of the curved surface of the fulcrum member by one-half of the thickness of said flexible band.

13. A weighing scale having a fulcrum member provided with a curved bearing surface, a lever supported for rocking movement having a bearing surface adapted to traverse said curved bearing surface of the fulcrum member when the lever is rocked and provided with a weighted part operating as a poise, and suspending means for said lever including a part curved concentrically with the curved surface of the fulcrum member, adjustable means for holding said part in stationary position, and a flexible band connected with said curved part and adapted to wind thereon and having connection with the lever.

14. A weighing scale having two members, one of which is a fulcrum member and the other of which is a pendulating lever weighted at its lower part and supported for rocking movement upon the fulcrum member, one of said members having a curved bearing surface adapted for rolling contact with the other member during the rocking movement of said lever, and a flexible band affording connection between the members during rocking movement of said lever, one of said members having a surface traversed by said band curved with a radius less than that of said bearing surface by one half of the thickness of said band.

15. A weighing scale having a fulcrum member, means to support a load to be weighed, a pendulating lever weighted at its lower end and actuated from said load supporting means and supported for rocking movement upon said fulcrum member, index means including a member carried by said lever and a graduated scale traversed thereby, and a counterbalance for said index member carried by the lever.

16. A weighing scale having a fulcrum member, a pendulating lever weighted at its lower part and supported for rocking movement upon said fulcrum member, load supporting means, a draft member having a vertically directed part coupled with the lever to communicate rocking movement thereto and provided with a laterally directed arm operatively connected with the load supporting means, and means for compelling rectilinear movement of said draft member.

17. A weighing scale having a fulcrum member, a pendulating lever weighted at its lower part and supported for rocking movement upon said fulcrum member, load supporting means, a draft member having a vertically directed part coupled with the lever to communicate rocking movement thereto and provided with a laterally directed arm operatively connected with the load supporting means, and a pivoted lever coupled with said draft member and operable to compel rectilinear movement thereof.

18. A weighing scale having a fulcrum member, a pendulating lever weighted at its lower part and supported for rocking movement upon said fulcrum member, load supporting means, a draft member having a vertically directed part coupled with the lever to communicate rocking movement thereto and provided with spaced parts and with a laterally directed arm operatively connected with the load supporting means, and a pivoted lever having spaced parts pivotally coupled with the spaced parts of said draft member and operable to compel rectilinear movement thereof.

In witness whereof I have hereunto signed my name in the presence of two subscribing witnesses.

WILHELM SIMONSSON.

Witnesses:
W. E. LAWSON,
K. R. HARKEY.